United States Patent
Weiner et al.

(10) Patent No.: US 12,526,613 B2
(45) Date of Patent: Jan. 13, 2026

(54) METHOD AND SYSTEM FOR DETECTING AN INTERRUPTION IN A DATA TRANSMISSION FROM A VEHICLE TO A VEHICLE-EXTERNAL SERVER

(71) Applicant: Bayerische Motoren Werke Aktiengesellschaft, Munich (DE)

(72) Inventors: Michael Weiner, Munich (DE); Peter Winklhofer, Munich (DE); Robert Meinlschmidt, Munich (DE); Theresa Reiner, Munich (DE); Markus Anton, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 82 days.

(21) Appl. No.: 18/681,453

(22) PCT Filed: Jul. 1, 2022

(86) PCT No.: PCT/EP2022/068315
§ 371 (c)(1),
(2) Date: Feb. 5, 2024

(87) PCT Pub. No.: WO2023/041214
PCT Pub. Date: Mar. 23, 2023

(65) Prior Publication Data
US 2024/0340617 A1    Oct. 10, 2024

(30) Foreign Application Priority Data

Sep. 14, 2021 (DE) .......................... 102021123786.6

(51) Int. Cl.
*H04L 43/00* (2022.01)
*H04L 67/12* (2022.01)
(Continued)

(52) U.S. Cl.
CPC .............. *H04W 4/40* (2018.02); *H04L 67/12* (2013.01); *H04W 12/12* (2013.01)

(58) Field of Classification Search
CPC .......... H04L 43/00; H04L 67/12; H04W 4/40; H04W 12/12
See application file for complete search history.

(56) References Cited

U.S. PATENT DOCUMENTS 8,452,465 B1 * 5/2013 Sinha .................... G06F 11/143
365/189.08
9,471,770 B2 * 10/2016 Beyer .................... G06F 21/44
(Continued)

FOREIGN PATENT DOCUMENTS

DE     102013205285 A1    10/2013
DE     102020215586 A1    6/2021

OTHER PUBLICATIONS

International Search Report corresponding to International Patent Application No. PCT/EP2022/068315, dated Oct. 6, 2022 (4 pages).
(Continued)

*Primary Examiner* — Tan Q Nguyen
(74) *Attorney, Agent, or Firm* — Maginot, Moore & Beck LLP

(57) ABSTRACT

A method for detecting an interruption in a data transmission from a vehicle to a security-related function of a vehicle-external server includes receiving a data transmission of one or more control units of the vehicle using the security-related function of the vehicle-external server, and receiving a reference control unit state of the vehicle using the vehicle-external server. The method also includes determining an actual control unit state of the vehicle depending on the received data transmission, and checking for a deviation of the actual control unit state of the vehicle from the reference control unit state of the vehicle. The method further includes detecting an interruption in the data trans-
(Continued)

mission of one or more control units of the vehicle to the security-related function of the vehicle-external server responsive to a determination that the deviation of the actual control unit state from the reference control unit state is present.

20 Claims, 2 Drawing Sheets

(51) Int. Cl.
*H04W 4/40* (2018.01)
*H04W 12/12* (2021.01)

(56) References Cited

U.S. PATENT DOCUMENTS

| | | | |
|---|---|---|---|
| 11,165,851 B2* | 11/2021 | Galula | H04L 63/1441 |
| 2021/0192867 A1* | 6/2021 | Fang | G07C 5/0816 |
| 2021/0194921 A1* | 6/2021 | Guajardo Merchan | G06F 8/65 |
| 2024/0338474 A1* | 10/2024 | Shelly | G06Q 10/103 |
| 2024/0357014 A1* | 10/2024 | Kolberg | H04L 67/34 |

OTHER PUBLICATIONS

Written Opinion corresponding to International Patent Application No. PCT/EP2022/068315, dated Oct. 6, 2022 (7 pages).

* cited by examiner

METHOD AND SYSTEM FOR DETECTING AN INTERRUPTION IN A DATA TRANSMISSION FROM A VEHICLE TO A VEHICLE-EXTERNAL SERVER

The present application is the U.S. national phase of PCT Application PCT/EP2022/068315 filed on Jul. 1, 2022, which claims priority of German patent application No. 102021123786.6 filed on Sep. 14, 2021, which is incorporated herein by reference in its entirety.

TECHNICAL FIELD

The disclosure relates to the field of detecting an interruption in a data transmission from a vehicle to a security-related function of a vehicle-external server, computer-readable medium, system and vehicle.

BACKGROUND

Vehicles can transmit security-related data from the vehicle to backend servers. It is often not possible to establish whether the security-related data are completely transmitted from the vehicle.

There is a need, therefore, to efficiently detect an interruption in a data transmission from a vehicle to a vehicle-external server. In particular, there is a need to efficiently detect a complete transmission of security-related data from a vehicle to a vehicle-external server.

SUMMARY

The above-described needs, as well as others, are achieved by at least some embodiments disclosed herein.

A first aspect of the disclosure is characterized by a method for detecting an interruption in a data transmission from a vehicle to a security-related function of a vehicle-external server. The method can be a computer-implemented method and/or a control-unit-implemented method. The vehicle can be a motor vehicle or a motor cycle. The security-related function can be a security-related service of the vehicle-external server. The security-related function can be, for example, a backend service of an intrusion detection system, IDS for short, of the vehicle. The data transmission can be a security-related data transmission of the vehicle. The data transmission be, example, can for a data transmission of the IDS of the vehicle. Each data transmission can preferably comprise one or more data packets of one or more control units. A data packet of a control unit can comprise a message of the IDS of the respective control unit.

The method comprises receiving a data transmission of one or more control units of the vehicle by means of the security-related function of the vehicle-external server. The method further comprises receiving a reference control unit state of the vehicle by means of the vehicle-external server. The reference control unit state can be defined during the production of the vehicle. The reference control unit state can comprise, for example, a hardware and/or software configuration of one or more control units of the vehicle, preferably of all control units of the vehicle. The method further comprises determining an actual control unit state of the vehicle depending on the received data transmission. The actual control unit state can be a hardware and/or software configuration of one or more control units of the vehicle. The hardware and/or software configuration of the actual control unit state can be derived from the received data transmission. The received data transmission can comprise, for example, one or more unique identifiers of a hardware and/or software configuration of a control unit. A unique identifier can be, for example, a cryptographic certificate, a version number, or a different unique alphanumeric identifier of a software module and/or of a hardware module of a software device of the vehicle.

The method comprises checking for a deviation of the actual control unit state of the vehicle from the reference control unit state of the vehicle. The method detects an interruption in the data transmission of one or more control units of the vehicle to the security-related function of the vehicle-external server if a deviation of the actual control unit t state from the reference control unit state is present.

The method can advantageously efficiently detect a suppression of a data transmission of a control unit of a vehicle. Manipulations on a control unit and/or a bus system of the vehicle can thereby be efficiently detected by a vehicle-external server. A manipulation of the vehicle can be detected, for example, by an IDS component of a control unit. If a data transmission of the IDS is component absent, the security-related function of the vehicle-external server, for example an IDS backend service of the vehicle-external server, can detect that data transmission of the IDS component of the control unit is being suppressed. A suppression of the data transmission can be caused, for example, by an additional control unit installed by the attacker in a bus system of the vehicle, a manipulation of a software component of a control unit, a manipulation of a hardware component, a manipulation of a software configuration and/or a manipulation of a hardware configuration of a control unit of the vehicle.

According to one embodiment, the method can further comprise determining the received data transmission to a security-related function of the vehicle-external server as correct if no deviation of the actual control unit state from the reference control unit state is present. The method can thus determine a correct data transmission.

According to one or more embodiments, the data transmission can comprise one or more messages from one or more control units of the vehicle to the security-related function of the vehicle-external server. The method thus efficiently combines data transmissions from a plurality of control units of the vehicle.

According to at least some embodiments, the data transmission can be forwarded from a message-collecting component of the vehicle to the vehicle-external server, and/or the message-collecting component of the vehicle can collect and forward messages from one or more control units of the vehicle to the security-related function of the vehicle-external server on a time basis. The method can thus efficiently combine data transmissions from a plurality of control units of the vehicle.

According to some embodiments, a message from a control unit can be a message signed by the control unit, and/or a message from a control unit can comprise diagnostic data, and/or a message from a control unit can comprise a nonce value, and/or a message from the control unit can comprise one or more alarm messages from the control unit, and/or a message from a control unit can comprise a signal which is representative of the correct function of the control unit, and/or a message from a control unit can be a push message, and/or a message from a control unit can be a pull message. The method can thus be flexibly adapted to different control units. Furthermore, the vehicle-external server can flexibly evaluate the messages from the received data transmission in terms of completeness, integrity and/or freshness. The security of the method can thus be efficiently increased.

According to one or more embodiments, determining the actual control unit state of the vehicle depending on the received data transmission can comprise: determining a control unit of the vehicle as the sender for each message of the received data transmission, and adding the determined control units to a set of actual control units of the vehicle, wherein the set of actual control unit of the vehicle corresponds to the actual control unit state of the vehicle.

According to a further advantageous embodiments, checking for a deviation of the actual control unit state of the vehicle from the reference control unit state can comprise determining a deviation of the set of actual control units of the actual control unit state from a set of reference control units of a reference control unit state.

According to some embodiments, the method can further comprise checking the integrity of each signed message from the received data transmission and/or checking the freshness of each message using the nonce value of the message from the received data transmission, and/or checking the completeness of the message from the received data transmission, and/or checking for the presence of alarm messages and/or signals in the received data transmission which are representative for the correctness of the respective control unit. The method can thus flexibly check the received data transmission.

According to a further advantageous embodiment, the reference control unit state can be a reference control unit installation state of the vehicle, and/or the actual control unit state can be an actual control unit installation state of the vehicle, and/or the actual control unit state can comprise a historical progression from the control unit, and/or the actual of messages control unit state can comprise a current progression of messages from the control unit. A comparison between the reference state and the actual state can thus be efficiently carried out.

A further aspect is characterized by a computer-readable medium for detecting an interruption in a data transmission from a vehicle to a security-related function of a vehicle-external server, wherein the computer-readable medium comprise instructions which, when executed on a computer, carry out the method described above.

A still further aspect is characterized by a system for detecting an interruption in a data transmission from a vehicle to a security-related function of a vehicle-external server, wherein the system described above is designed to carry out the method.

Yet another aspect is characterized by a vehicle comprising the system described above for detecting an interruption in a data transmission from a vehicle to a security-related function of a vehicle-external server.

Further features are set out in the claims, the figures and the description of the figures. All features and feature combinations specified above in the description and the features and feature combinations specified below in the description of the figures and/or shown in the figures alone are usable not only in the respective indicated combination, but also in other combinations or in isolation.

An exemplary embodiment is described below with reference to the attached figures.

DETAILED DESCRIPTION

Figure 1:
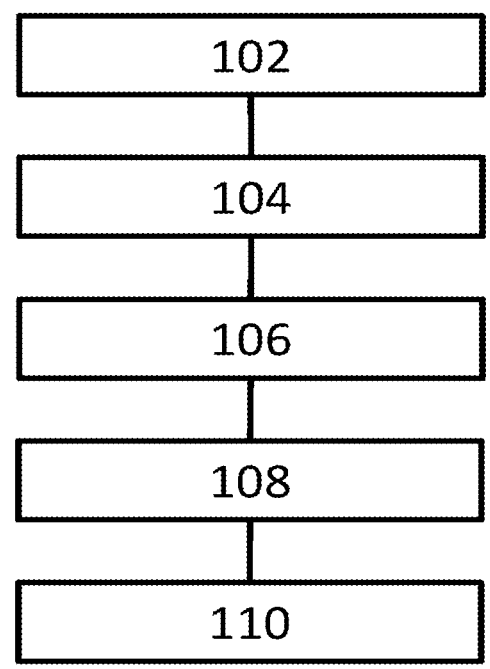
FIG. 1 shows schematically an example of a method for detecting an interruption in a data transmission from a vehicle to a security-related function of a vehicle-external server.

In detail, FIG. 1 shows an example of a method 100 for detecting an interruption in a data transmission from a vehicle to a security-related function of a vehicle-external server. The method 100 can receive 102 a data transmission from one or more control units of the vehicle by means of the security-related function of the vehicle-external server. The data transmission can comprise a message from one or more control units. The messages from the control units can be collected by a message-collecting component of the vehicle and can be collectively forwarded in a data transmission from the vehicle to the vehicle-external server. Each control unit of the vehicle preferably has an IDS component. The IDS components of the control units can be a distributed IDS of the vehicle. A message from a control unit can be a message from the IDS component of a control unit. A message from an IDS component of a control vehicle can be a message which is representative of a detected attack, or can be a message which is representative of no detected attack. The security-related function of the vehicle-external server can be a backend component or backend servers.

The method 100 can comprise receiving a reference control unit state of the vehicle by means of the vehicle-external server. The reference control unit state can be a reference control unit installation state. The reference control unit installation state can comprise all control units of the vehicle installed in the vehicle. The reference control unit installation state preferably comprises only control units which have been installed in the vehicle by the manufacturer of the vehicle during production of the vehicle, and/or control units of which the installation was authorized by the manufacturer of the vehicle. The reference control unit installation state can comprise hardware components, software components, hardware configuration and/or software configuration of the control unit.

The method 100 can determine 106 an actual control unit state of the vehicle depending on the received data transmission. The actual control unit state can be an actual control unit installation state. In determining the actual control unit installation state, the method can identify, on the basis of the received data transmission, control units which have forwarded a message to the vehicle-external server with the received data transmission. The identified control units can form the actual control unit installation state.

The method 100 can further check 108 for a deviation of the actual control unit state, in particular the actual control unit installation state, of the vehicle from the reference control unit state, in particular the reference control unit installation state, of the vehicle. To do this, the method 100 can compare the control units of the reference control unit installation state with the determined control units of the actual control unit installation state. If a deviation of the actual control unit state, in particular the actual control unit installation state, from the reference control unit state, in particular the reference control unit installation state, is present, the method 100 can detect 110 an interruption or a failure in the data transmission of one or more control units of the vehicle to the security-related function of the vehicle-external server.

If an attacker performs a manipulation on a vehicle which has a distributed IDS, the attacker can filter messages from an IDS component of a control unit by means of further manipulations, such as, for example, by means of a bus filter, so that said messages are no longer transmitted to the vehicle-external server. Despite the filtering of the messages from an IDS component of a control unit, the method can detect the suppression/filtering of the messages and therefore a manipulation of the control unit by the attacker. Along can be triggered by the vehicle-external server.

Figure 2:
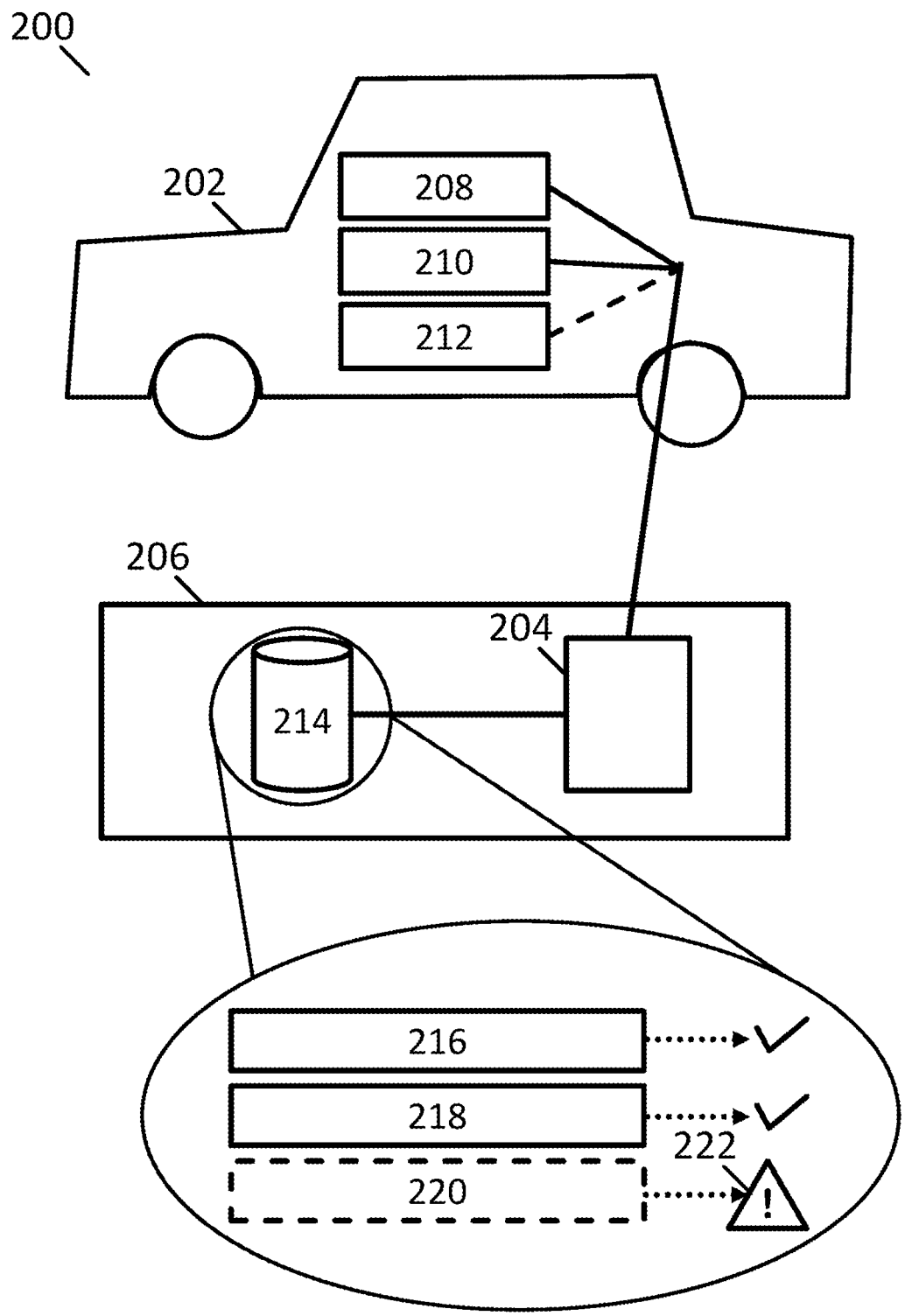
FIG. 2 shows schematically an example of a system for detecting an interruption in a data transmission from a vehicle to a security-related function of a vehicle-external server.

In detail, FIG. 2 shows an example of a system for detecting an interruption in a data transmission from a vehicle 202 to a security-related function 204 of a vehicle-external server 206. The vehicle 202 can comprise three control units 208, 210, 212. The control units 208 and 210 are functioning correctly. The control unit 212 has been manipulated by an attacker so that a detected attack is suppressed by an IDS component of the vehicle. The security-related function 204 receives only messages 216, 218 from the control unit 208 and 210. The messages 216, 218 from the received data transmission can be stored in a database 214. By means of a comparison of the reference state with the actual state as described above in connection with FIG. 1, the security-related function can detect that the message 220 from the control unit 212 is absent from the received data transmission. Due to the absence of the message 220, the security-related function 204 of the vehicle-external server can trigger an IDS alarm. The security-related component can, for example, provide an alarm message to the vehicle manufacturer, to the user and/or to a third party with information relating to a suppression or failure of a message from the IDS component of the control unit 212.

The method 100 or the system 200 can advantageously efficiently detect a failure of intrusion detection data from one or more control units. Whenever the data transmission is evaluated with intrusion detection data by the security-related function, a check can be carried out to determine whether messages or IDS data are completely present for all expected control units. If it is established that IDS data have not been completely transmitted, in IDS alarm can be triggered for this vehicle.

REFERENCE SIGN LIST

100 Method
102 Receive a data transmission
104 Receive a reference control unit state
106 Determine an actual control unit state
108 Check for a deviation of the actual control unit state from the reference control unit state
110 Detect an interruption in the data transmission
200 System
202 Vehicle
204 Security-related function
206 Vehicle-external server
208 Control unit
210 Control unit
212 Manipulated control unit
214 Database
216 Message
218 Message
220 Missing message
222 Alarm message

The invention claimed is:

1. A method for detecting an interruption in a data transmission from a vehicle to a security-related function of a vehicle-external server, the method comprising:

receiving a data transmission of one or more control units of the vehicle using the security-related function of the vehicle-external server;
receiving a reference control unit state of the vehicle using the vehicle-external server;
determining an actual control unit state of the vehicle depending on the received data transmission;
checking for a deviation of the actual control unit state of the vehicle from the reference control unit state of the vehicle; and
detecting an interruption in the data transmission of one or more control units of the vehicle to the security-related function of the vehicle-external server responsive to a determination that the deviation of the actual control unit state from the reference control unit state is present.

2. The method as claimed in claim 1, the method further comprising:
determining the received data transmission to the security-related function of the vehicle-external server as correct responsive to a determination that no deviation of the actual control unit state from the reference control unit state is present.

3. The method as claimed in claim 1, wherein the data transmission comprises one or more messages from one or more control units of the vehicle to the security-related function of the vehicle-external server.

4. The method as claimed in claim 3, wherein the data transmission is forwarded from a message-collecting component of the vehicle to the vehicle-external server.

5. The method as claimed in claim 4, wherein the message-collecting component of the vehicle collects and forwards messages from one or more control units of the vehicle to the security-related function of the vehicle-external server on a time basis.

6. The method as claimed in claim 3, wherein a message from a control unit of the one or more messages from the one or more control units is a message signed by the control unit.

7. The method as claimed in claim 6, wherein the method further comprises:
checking an integrity of the message signed by the control unit from the received data transmission.

8. The method as claimed in claim 6, wherein the message from the control unit comprises at least one of the group consisting of: diagnostic data; a nonce value; one or more alarm messages; a signal which is representative of the correct function of the control unit; a push message, and a pull message.

9. The method as claimed in claim 3 wherein a message from a control unit of the one or more messages from the one or more control units includes at least one of the group consisting of: a message signed by the control unit; diagnostic data; a nonce value; one or more alarm messages; a signal which is representative of the correct function of the control unit; a push message, and a pull message.

10. The method as claimed in claim 9, wherein determining the actual control unit state of the vehicle depending on the received data transmission comprises:
determining a control unit of the vehicle as the sender for each message of the received data transmission; and
adding the determined control units to a set of actual control units of the vehicle, wherein the set of actual control unit of the vehicle corresponds to the actual control unit state of the vehicle.

11. The method as claimed in claim 3, wherein determining the actual control unit state of the vehicle depending on the received data transmission comprises:

determining a control unit of the vehicle as the sender for each message of the received data transmission; and adding the determined control units to a set of actual control units of the vehicle, wherein the set of actual control unit of the vehicle corresponds to the actual control unit state of the vehicle.

12. The method as claimed in claim 1, wherein determining the actual control unit state of the vehicle depending on the received data transmission comprises:

determining a control unit of the vehicle as the sender for each message of the received data transmission; and adding the determined control units to a set of actual control units of the vehicle, wherein the set of actual control unit of the vehicle corresponds to the actual control unit state of the vehicle.

13. The method as claimed in claim 12, wherein checking for the deviation of the actual control unit state of the vehicle from the reference control unit state comprises:

determining a deviation of the set of actual control units of the actual control unit state from a set of reference control units of a reference control unit state.

14. The method as claimed in claim 1, wherein the method further comprises at least one of the group consisting of:

checking an integrity of each signed message from the received data transmission;

checking a freshness of each message using a nonce value of the message from the received data transmission;

checking a completeness of a message from the received data transmission;

checking for a presence of alarm messages; and checking for signals in the received data transmission which are representative of a correctness of a respective control unit.

15. The method as claimed in claim 1, wherein at least one of the group consisting of:

the reference control unit state is a reference control unit installation state of the vehicle;

the actual control unit state is an actual control unit installation state of the vehicle;

the actual control unit state is a historical progression of messages from the control unit; and the actual control unit state comprises a current progression of messages from the control unit.

16. A non-transitory computer-readable medium for detecting an interruption in a data transmission from a vehicle to a security-related function of a vehicle-external server, wherein the non-transitory computer-readable medium comprises instructions which, when executed on a computer, carry out the method as claimed in claim 1.

17. A system for detecting an interruption in a data transmission from a vehicle to a security-related function of a vehicle-external server, wherein the system is designed to carry out the method as claimed in claim 1.

18. A vehicle comprising the system for detecting an interruption in a data transmission from a vehicle to a security-related function of a vehicle-external server as claimed in claim 17.

19. The method as claimed in claim 1, wherein checking for the deviation of the actual control unit state of the vehicle includes determining that the deviation of the actual control unit state of the vehicle from the reference control unit state is present.

20. The method as claimed in claim 19, wherein:

the reference control unit state is a reference control unit installation state of the vehicle;

the actual control unit state is an actual control unit installation state of the vehicle;

checking for the deviation of the actual control unit state of the vehicle includes comparing the reference control unit installation state of the vehicle with the actual control unit installation state of the vehicle; and if a deviation of the actual control unit installation state from the reference control unit installation state is present, detecting an interruption or a failure in the data transmission of one or more control units of the vehicle to the security-related function of the vehicle-external server.

* * * * *